UNITED STATES PATENT OFFICE.

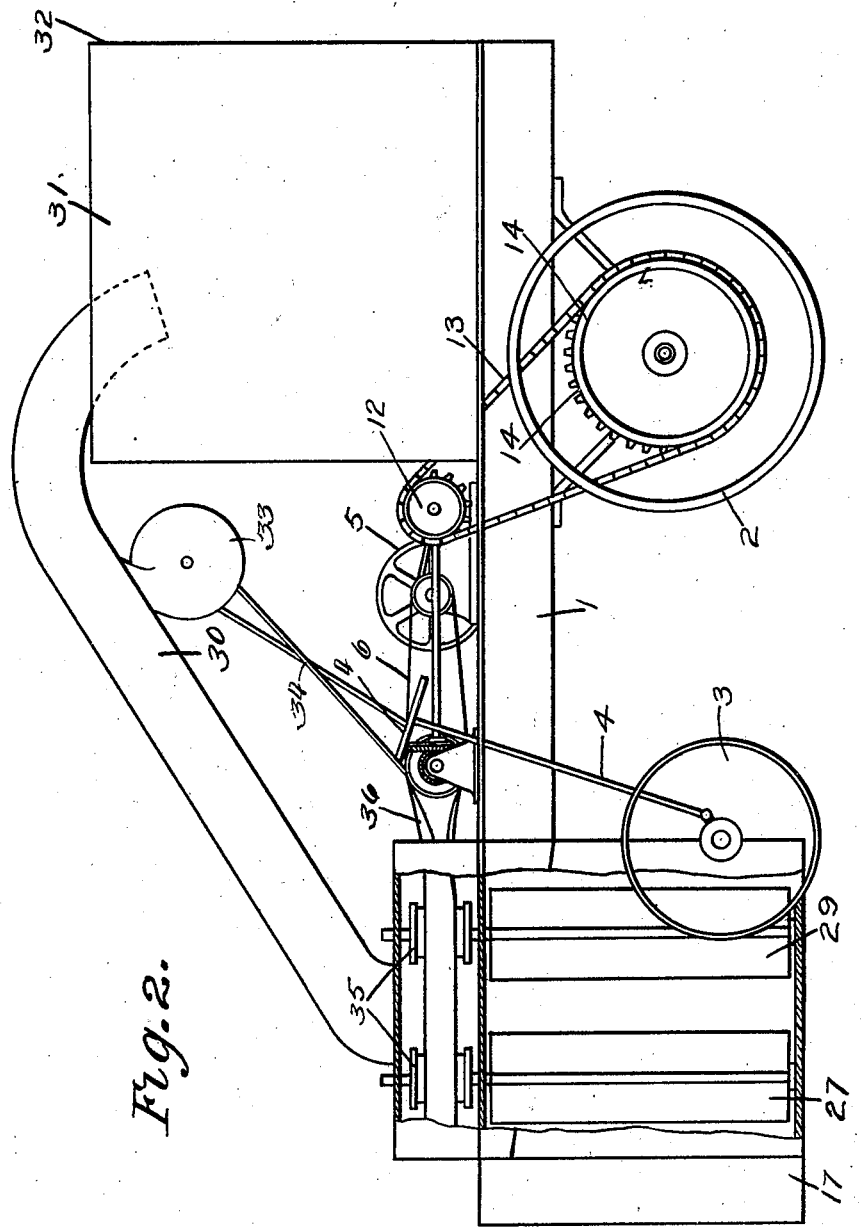

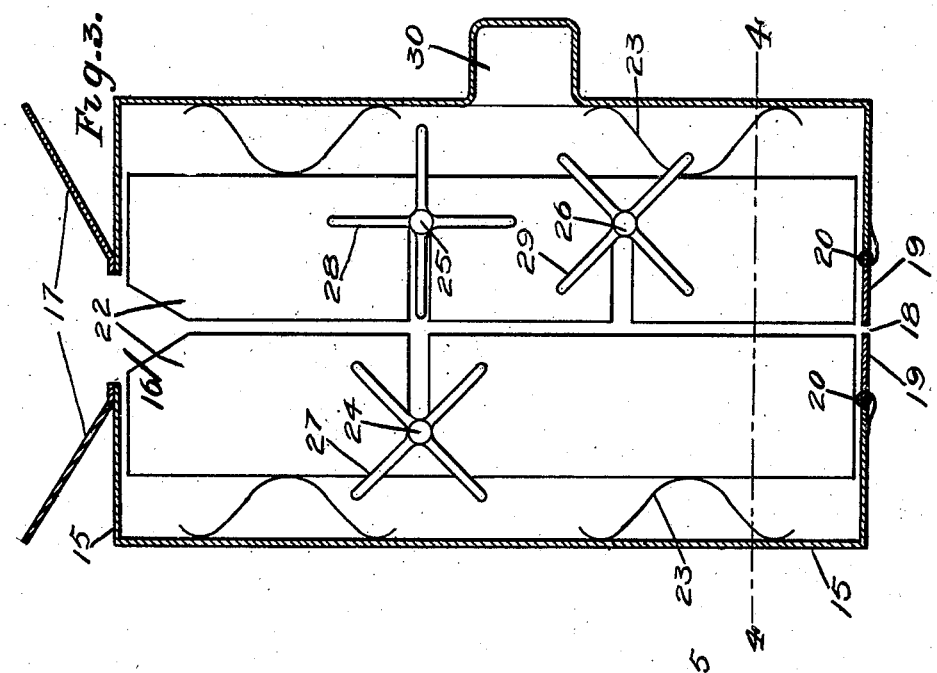
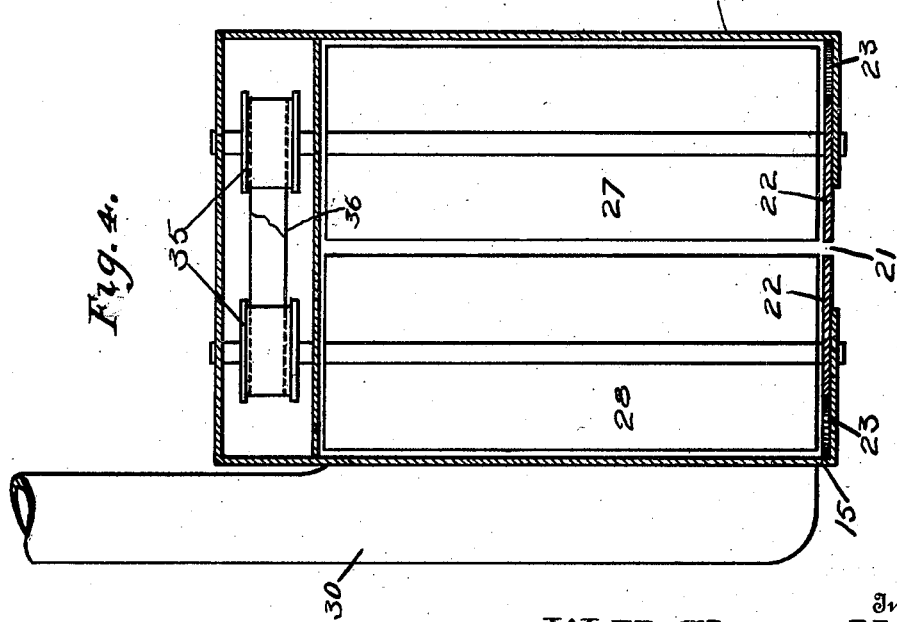

WILLIAM HARRISON CHANCELLOR, OF STRONG, ARKANSAS.

COTTON-HARVESTER.

1,342,528.   Specification of Letters Patent.   Patented June 8, 1920.

Application filed August 18, 1919. Serial No. 318,251.

*To all whom it may concern:*

Be it known that I, WILLIAM HARRISON CHANCELLOR, a citizen of the United States, residing at Strong, in the county of Union and State of Arkansas, have invented a new and useful Cotton-Harvester, of which the following is a specification.

This invention relates to machines for harvesting cotton, one of its objects being to provide a machine which can be moved along a row of cotton plants and will, during such movement beat the cotton bolls from the plants and direct them into a stacker which will conduct the cotton to a container provided therefor.

A further object is to provide means whereby the harvested cotton is collected, there being an arrangement of closures for preventing the cotton from being scattered by the harvesting mechanism.

Another object is to provide a structure which is simple, compact, and durable, a single motor being used for propelling the machine and for operating the harvesting mechanism.

Another object is to provide combined beaters and fans.

With the foregoing and other objects in view which will appear as the description proceeds, the invention consists of certain novel details of construction and combinations of parts which will be hereinafter more fully described and claimed, it being understood that various changes may be made in the construction and arrangement of parts without departing from the spirit or sacrificing any of the advantages of the invention as set forth in the appended claims.

In the accompanying drawings the preferred form of the invention has been shown.

In said drawings—

Fig. 2 is a view partly in side elevation and partly in section.

Fig. 3 is a horizontal section through the harvesting mechanism.

Fig. 4 is a section on line 4—4, Fig. 3.

Figure 1:
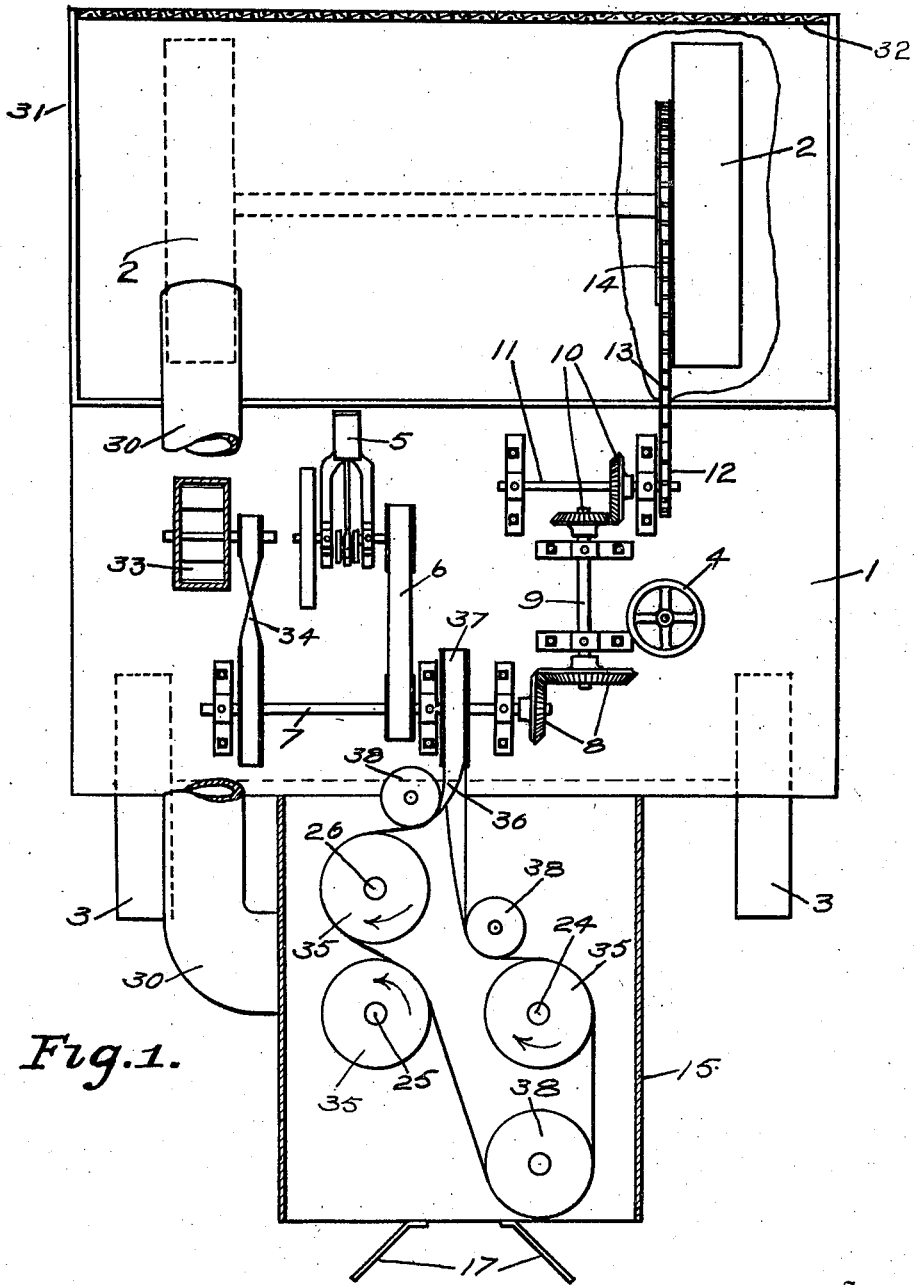
Figure 1 is a plan view of the machine, parts being removed.

Referring to the figures by characters of reference, 1 designates a truck having rear supporting wheels 2 and front or steering wheels 3, there being steering mechanism of the usual type connected to the wheels 3 whereby the machine can be guided readily while in use, this mechanism being shown generally at 4. An engine 5 is mounted on the truck and transmits motion through a belt 6 to a shaft 7 which, in turn transmits motion through gears 8 to another 9. This last named shaft drives gears 10 which operate a shaft 11 having a sprocket 12. A chain 13 receives motion from this sprocket and drives a sprocket 14 secured to one of the wheels 2. Thus the entire machine can be driven forward and by providing suitable clutch mechanism, not shown, the machine can be stopped or started during the operation of the engine.

Connected to and supported in front of the truck 1 is a housing 15 having a plant inlet opening 16 in the front thereof and at the sides of which opening are arranged deflecting wings 17. A plant outlet opening 18 is provided at the back of this housing and is normally closed by light hinged doors 19 held normally closed by springs 20, or in any other desired manner. An opening extends longitudinally within the bottom of the housing from the inlet to the outlet openings, as shown at 21 and mounted on the bottom of the housing at opposite sides of this opening 21 are slidable closures 22 having springs 23 for pressing them toward each to normally close the bottom opening 21. The inner edges of these slidable closures diverge forwardly at their front ends so that the stalks of plants can enter freely between them.

Journaled within the housing 15 are vertical shafts 24 and 25 arranged at opposite sides of the bottom opening 18 and at equal distances from the front of the housing. Another shaft 26 is arranged vertically back of the shaft 25. Beater blades 27 are extended from the shaft 24 and similar beater blades 28 and 29 and extended radially from the shafts 25 and 26 respectively. An opening is formed in one side of the housing 15 opposite the space between the shafts 25 and 26 and extending from this opening is an outlet flue 30 extending to a receptacle 31 mounted on the truck and which receptacle may be provided with a wall formed of a screen fabric, as shown at 32. A fan 33 is provided for boosting air within the flue 30 and this fan is driven through belt and pulley mechanism 34 driven by the shaft 7.

Pulleys 35 are connected to the upper ends of the shafts and a belt 36, driven by a pulley 37 on the shaft 7, drives these pulleys and their shafts in the directions indicated by the arrows in Fig. 1. Suitably located idler pulleys 38 are mounted to guide the belt, as shown.

In using the machine described the same is driven along a row of cotton plants and said plants will be received in the front opening 16 of the housing, pass between the spring pressed closures 22 and then through the back opening 18. The doors or closures 22 and 19 will be normally shut. As the plants are received within the housing 15 the rotating blades 27 and 28 will beat the cotton bolls from the plants and said bolls will thereafter be directed by the blades 28 and 29 laterally through the side opening in the housing and into the flue 30. The current of air set up by the blades will be sufficient to carry the harvested cotton up to the fan 33 where the current will be boosted and the said cotton conveyed to the container 31.

As the shafts 24, 25 and 26 extend through the bottom closures 22 slots 39 are provided in said closures whereby the closures can move transversely within the housing without interference from the said shafts.

What is claimed is:—

1. In a cotton harvester the combination with a vehicle, of a housing supported in front thereof and movable therewith, said housing having front, bottom and rear plant receiving openings in communication with each other, means for closing the bottom and rear openings after plants have passed therethrough, and cotton beaters in the housing and above the bottom closures.

2. In a cotton harvester the combination with a movably supported housing adapted to straddle and move along a row of plants, of a flue extending from the housing, revoluble beaters within the housing, and a revoluble blade coöperating with the beaters for expelling cotton into the flue.

3. In a cotton harvester the combination with a movably supported housing adapted to straddle and move along a row of plants, of a flue extending from the housing, parallel beaters within the housing, a revoluble blade within the housing and coöperating with the beaters for expelling harvested cotton into the flue, and a fan for boosting the cotton within the flue to the outlet thereof.

In testimony that I claim the foregoing as my own, I have hereto affixed my signature in the presence of two witnesses.

WILLIAM HARRISON CHANCELLOR.

Witnesses:
JAMES HARMON PHILLIP,
JAMES S. COLEMAN.